(12) United States Patent
Dickson, Jr.

(10) Patent No.: US 6,854,876 B2
(45) Date of Patent: Feb. 15, 2005

(54) NESTABLE BLENDING JAR APPARATUS

(75) Inventor: Thomas D. Dickson, Jr., Midway, UT (US)

(73) Assignee: K-Tec, Inc., Orem, UT (US)

( * ) Notice: Subject to any disclaimer, the term of this patent is extended or adjusted under 35 U.S.C. 154(b) by 0 days.

(21) Appl. No.: 10/457,899

(22) Filed: Jun. 10, 2003

(65) Prior Publication Data

US 2003/0213373 A1 Nov. 20, 2003

Related U.S. Application Data

(63) Continuation of application No. 10/150,919, filed on May 17, 2002, now Pat. No. 6,811,303.

(51) Int. Cl.[7] .............................................. A47J 43/046
(52) U.S. Cl. ........................ 366/205; 366/314; 206/518
(58) Field of Search ................................ 366/130, 205, 366/206, 314; 99/348; 206/515, 518, 519; 220/671, 756, 769, 771, DIG. 13; 215/10

(56) References Cited

U.S. PATENT DOCUMENTS

| 2,271,822 A | * | 2/1942 | Hills | |
| 2,798,701 A | * | 7/1957 | Collura | 366/205 |
| 2,803,375 A | * | 8/1957 | Meshberg | 206/515 |
| 2,885,134 A | * | 5/1959 | Cohen | |
| 2,932,437 A | * | 4/1960 | Wilcox | 229/402 |
| 3,240,246 A | * | 3/1966 | Dewenter | 241/98 |
| 3,596,795 A | * | 8/1971 | D'Ercoli | 206/514 |
| 3,810,470 A | * | 5/1974 | Von Gunten | 206/515 |
| 3,841,528 A | * | 10/1974 | Eisenberg | 206/519 |
| 4,136,022 A | * | 1/1979 | Hutzler et al. | 206/515 |
| 4,467,934 A | * | 8/1984 | Hummer | 220/741 |
| 5,219,419 A | * | 6/1993 | Prothe | 206/515 |
| 5,323,973 A | * | 6/1994 | Ferrara, Jr. | 241/37.5 |
| 5,454,470 A | * | 10/1995 | Bricker | 206/519 |
| 5,655,834 A | * | 8/1997 | Dickson | 366/205 |
| 6,186,395 B1 | * | 2/2001 | Kennett | 206/515 |
| 6,338,569 B1 | * | 1/2002 | McGill | 366/314 |
| 6,394,297 B1 | * | 5/2002 | Nance | |
| 6,755,305 B2 | * | 6/2004 | Nance | |

* cited by examiner

Primary Examiner—Charles E. Cooley
(74) Attorney, Agent, or Firm—Holland & Hart

(57) ABSTRACT

A blending jar apparatus is disclosed and includes a plurality of walls and a handle secured to one of the plurality of walls. The handle includes an aperture receptive of a handle of another blending jar apparatus. One of the plurality of walls may include a truncated wall, to which the handle is secured.

15 Claims, 13 Drawing Sheets

NESTABLE BLENDING JAR APPARATUS

RELATED APPLICATION

This is a continuation of U.S. patent application Ser. No. 10/150,919 filed 17 May 2002, now U.S. Pat. No. 6,811,303.

FIELD OF THE INVENTION

This invention relates to blending devices, and more particularly to blending devices capable of high-volume, rapid-succession production of blended beverages.

BACKGROUND OF THE INVENTION

Food processors and blending devices have existed for many years. One example of a blending device is shown and described in U.S. Pat. No. 5,655,834, which is incorporated in its entirety by this reference.

Food processors and blending machines are being used now more than ever, particularly in the high-volume, commercial beverage industry. People are increasingly becoming aware of the benefits, in terms of taste and quality, of well-processed beverages. Blended fruit smoothies and similar fruit drinks, popular with all types of people ranging from the fitness conscious to the less active, require a food processor or blending machine. Cold beverages, in particular, which utilize fruit (frozen or fresh) and ice to prepare present unique challenges in beverage preparation. An appropriate blending machine will break down the ice, fruit, and other ingredients in attempting to achieve an ideal uniform drink consistency. In addition, food processors or blending machines are ideal for mixing nutritional supplements into beverages while similarly attempting to achieve an ideal uniform drink consistency.

In addition to the recent increase in the popularity of smoothies, food processors and blending machines are being used to produce many new and different beverages. For example, different types of coffees, shakes, dairy drinks, and the like are now commonly served at many different types of retail business locations. Consumers are demanding more diversity and variety in the beverages available at these smoothie and other retail stores. The keys to producing a high quality beverage, irrespective of the specific type of beverage, are quality ingredients and a high quality blending machine that will quickly and efficiently blend the ingredients to produce a drink with uniform consistency.

One problem associated with businesses that depend on blending machines is the speed with which the beverage or drink is prepared. In the food preparation industry, time equals money. Beverages have traditionally been made by retrieving the appropriate ingredients, placing the ingredients inside a mixing container, and actuating a motor which drives a blade mounted inside the mixing container to blend the contents held within the mixing container. Virtually all traditional blending devices require some type of manual programming by tactile actuation (i.e., actuation by the operator's fingertips) of at least one switch, and commonly several switches (particularly where variable speeds are desired), through a key pad or the like to initiate operation of the blending device. Such programming requires focused action by the operator and, as a result, takes up time in the blending process. Each second of time wasted, even a fraction of a second of time wasted, adds up over time to significant amounts of money lost for any commercial operation.

Another problem with respect to prior blending devices relates to safety. While the potential for the beverage ingredients to be hurled all over the place may provide some incentive to place a lid on the mixing container before blending, any additional incentive to maintain a lid on the mixing container during processing will enhance safety.

Still another traditional problem with respect to blending devices relates to cavitation, which occurs when a pocket of air envelops the area surrounding the blade. Efforts are continually being made to design blending devices to reduce cavitation.

Yet another problem with respect to traditional blending devices relates to the type of ingredients that need to be mixed to create an optimal drink consistency, and the ability of the blending device to handle such ingredients. For example, individually quick frozen (IQF) fruit is now commonly used in making smoothies. Most blending devices are simply not capable of appropriately handling IQF fruit to achieve an optimal, uniform consistency.

In view of the foregoing, there is a need to provide a blending station apparatus and method of blending that will allow beverages to be made quickly and efficiently minimizing the overall time required between ordering a beverage and serving the beverage to the customer. There is also a need to provide a blending apparatus and blending method that will minimize the need to program the blending device just prior to actuating the device. There is still further a need to develop a blending device that reduces cavitation. Yet another need exists to provide a blending device with a blade and jar configuration that will produce a beverage with an optimal, uniform consistency with respect to all desired ingredients.

SUMMARY OF THE INVENTION

The present invention relates to a blending apparatus which includes an articulable housing that pivots relative to a surface, which may be a stationary base or the surface supporting the blending apparatus, to actuate at least one switch to initiate a blending cycle. As the switch is actuated, by downward pressure exerted on one side of the blending device, the blade mounted inside the mixing container rotates at a first speed. As the articulable housing is rotated further toward the stationary surface, one or more an additional switches may be actuated to causes the blade mounted within the mixing container to rotate at sequentially higher speeds. After the appropriate mixing, and the operator of the blending device releases the downward pressure on the housing, a bias member, such as a coil spring, urges the housing upward away from engagement with the switches to cut off power supplied to the motor and stop blade rotation.

Another aspect of the present invention relates to the internal shape of the mixing container. The mixing container geometry shifts the center of the fluid-flow vortex off-center relative to the rotational axis of the blade. This reduces cavitation which commonly occurs where the fluid-flow vortex is concentric with the axis of rotation of the blending blade.

Still another aspect of the present invention relates to the relative size of the mixing blade and its orientation relative to the sidewalls of the mixing container. The combined geometry of the mixing container in combination with the blade allows all types of ingredients, including IQF fruit, to be blended in the blending device to produce a drink with a desired, uniform consistency.

The foregoing and other features, utilities and advantages of the invention will become apparent from the following detailed description of the invention with reference to the accompanying drawings.

DETAILED DESCRIPTION OF THE INVENTION

Figure 1:
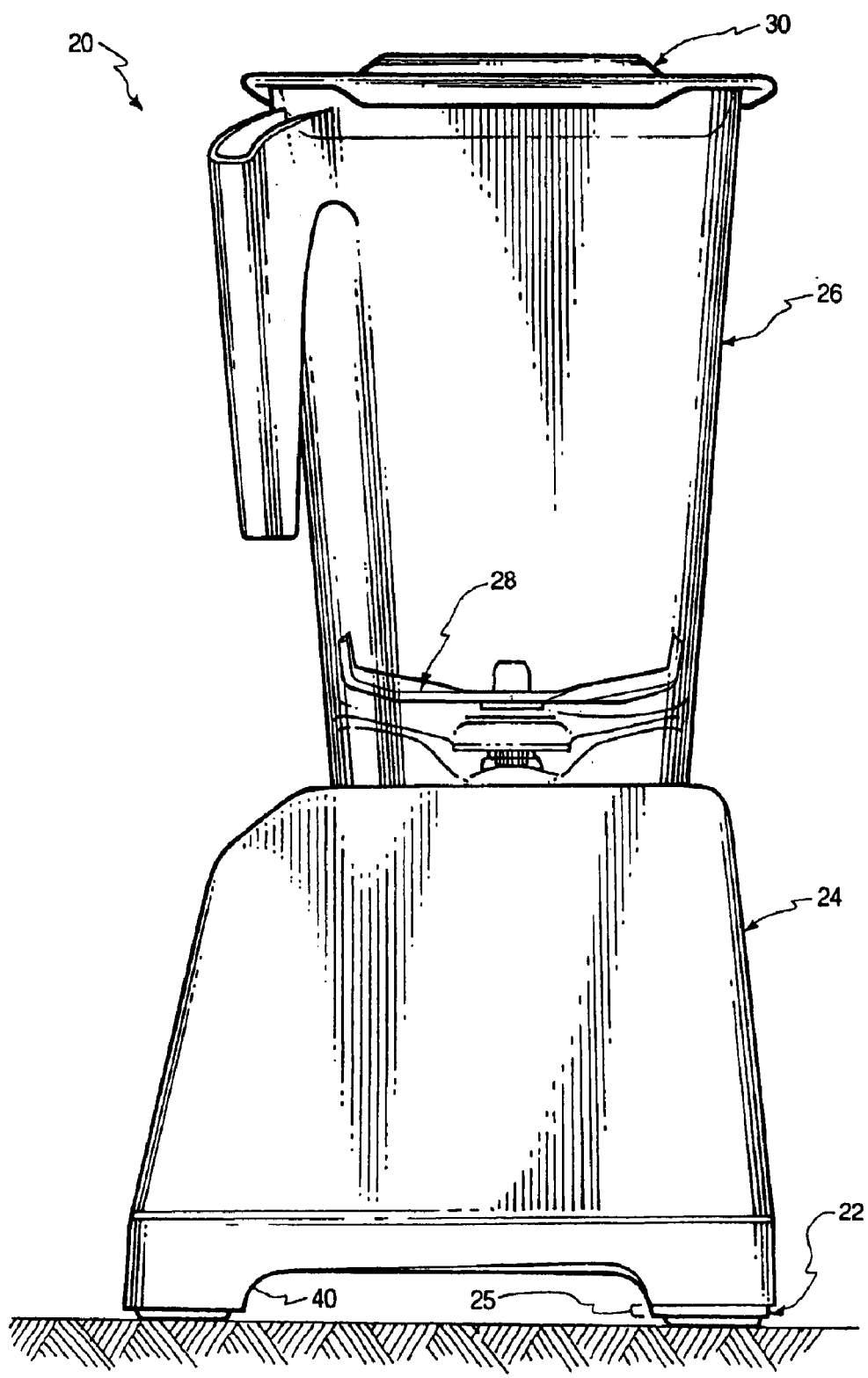
FIG. 1 is a side elevation view of a blending apparatus according to the present invention.

The present invention relates to a blending apparatus 20 which, in one embodiment, the blending apparatus 20 is a stand-alone, portable blending device.

The blending device 20 comprises a stationary base 22 and a motor housing or cover 24 which articulates relative to stationary base 22 to actuate one or more switches which cause the blender to operate. The description of the manner in which one or more switches are actuated is set forth below. The blending device 20 further comprises a mixing container or jar 26 in which a mixing blade 28 is rotatably mounted. The blending device still further comprises a lid 30 which covers the open end of the jar 26 during operation.

Figure 2:
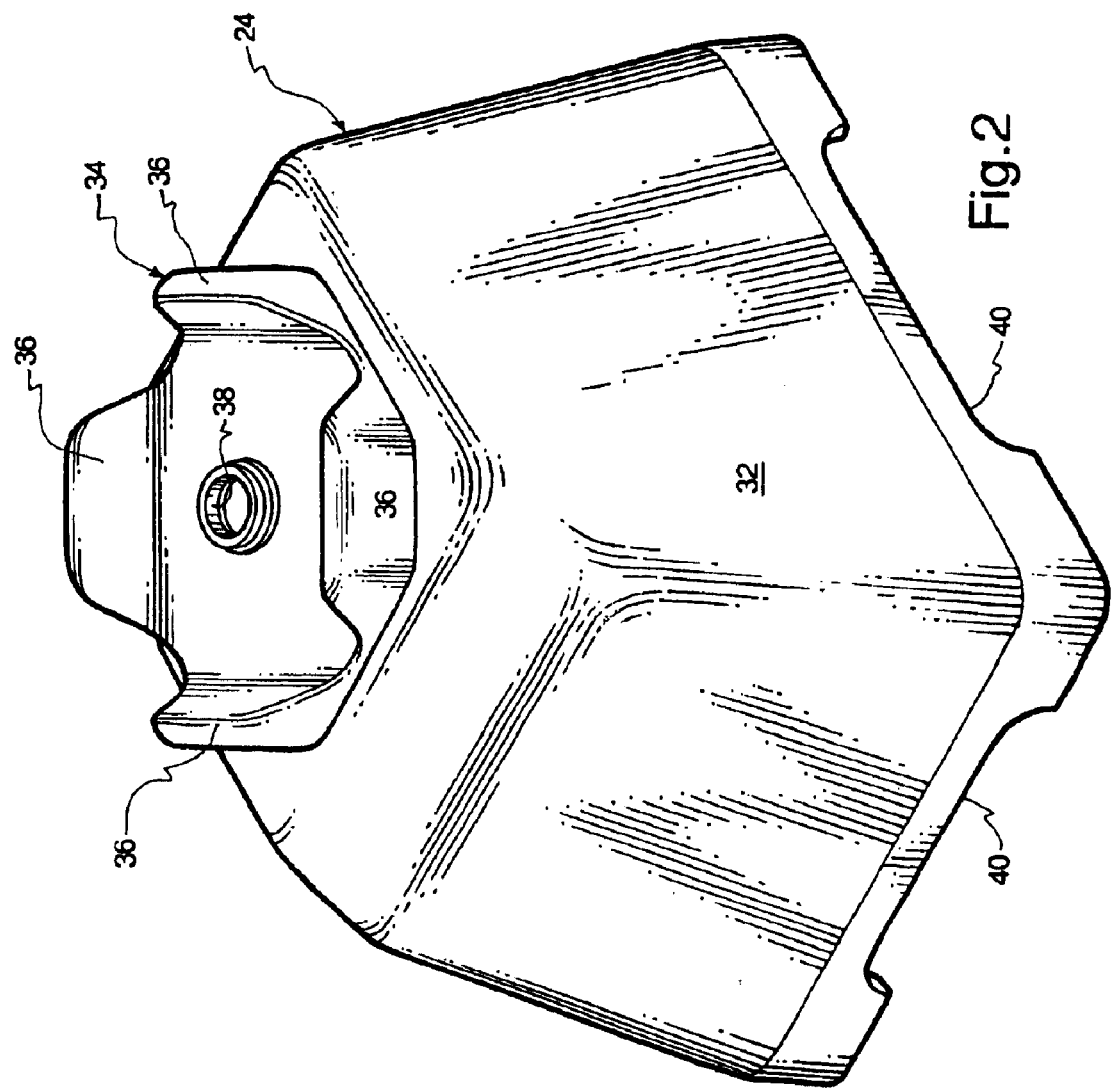
FIG. 2 is a perspective view of the articulable housing utilized in connection with the blending device of FIG. 1.
Figure 3:
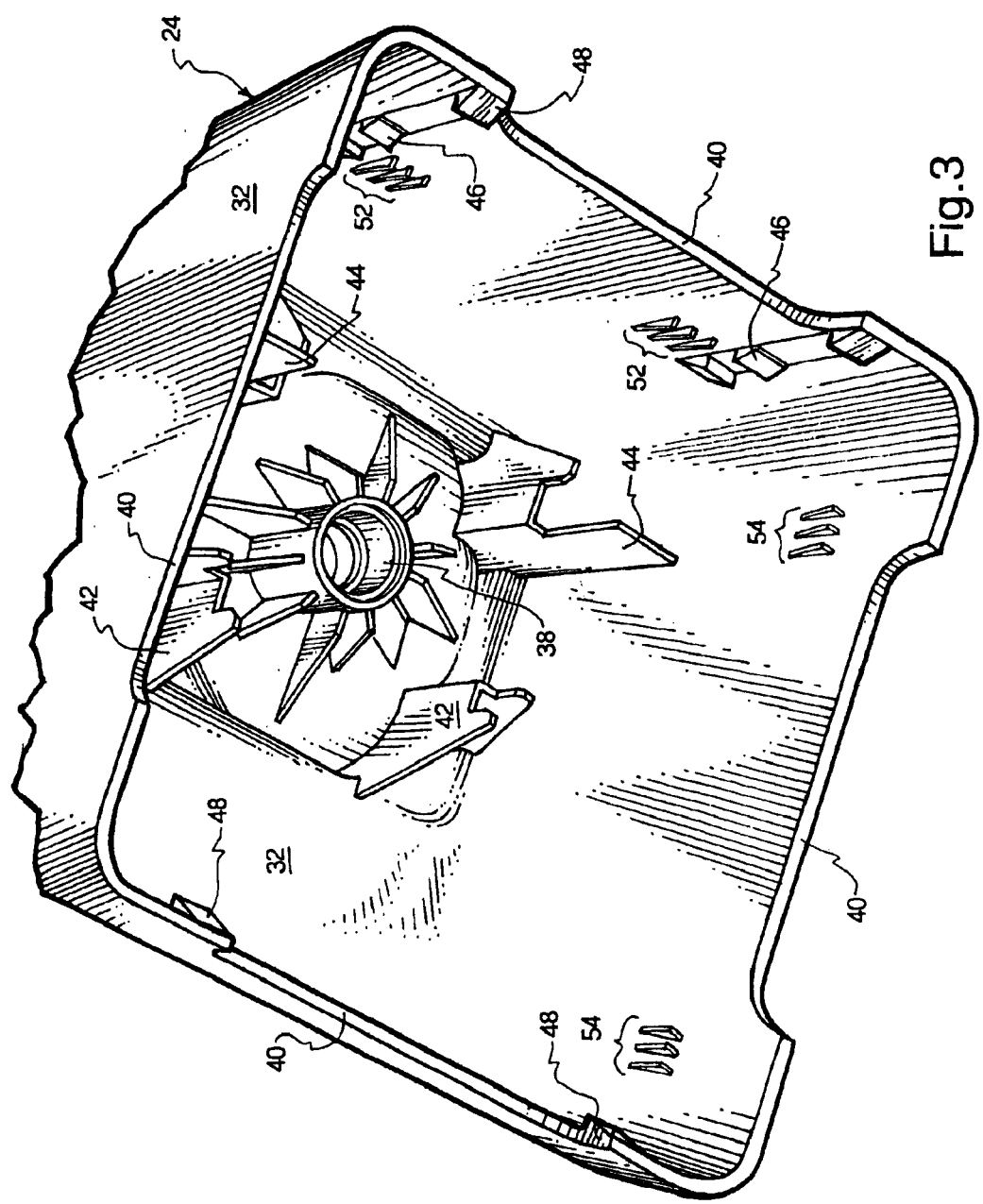
FIG. 3 is a perspective view of the underside of the housing of FIG. 2.

The housing or cover 24, as shown in FIGS. 2-3, comprises a shell-like cover structure 32 which serves to hold and protect the motor which drives the blending device 20. Any suitable motor know to those skilled in the art may be utilized without departing from the spirit and scope of the present invention. The housing 24 further defines a mounting base 34 for the jar which comprises four upstanding guide extensions 36 which serve to guide and hold the jar 26 in place in operative position on the housing. A central aperture 38 is formed in the articulable housing 24 which receives a splined receptacle coupled to the motor. The splined motor receptacle receives, in turn, the splined shaft coupled to the mixing blade (described below).

A plurality of archways 40 are formed in the bottom of housing 24. The archways 40 allow an appropriate amount of air circulation underneath the blending apparatus 20 and about the motor (described below).

With reference to FIG. 3, a plurality of relatively short motor guides or flanges 42 and a pair of relatively long motor guides or flanges 44 extend downwardly and integrally from the shell wall 32 of the housing 24. The guides 42, 44 require that an appropriately sized motor be mounted within the housing in an appropriate orientation so that the splined receptacle for the shaft of the blender blade 28 will be concentrically mounted within aperture 38.

A plurality of integral, first locking retainers 46 (FIG. 3) extend inwardly from the shell 32 to retain the switch plate 50 (FIGS. 6-8) within the housing 24. A plurality of integral, second locking retainers 48 also extend inwardly from the shell wall 32 to retain the stationary base 22 as part of the overall unit which comprises the blending apparatus 20. A plurality of first shelf members 52 (only two sets shown) extend inwardly and integrally from shell wall 32 to support the switch plate 50, and a plurality of second shelf members 54 (only set shown) extend inwardly and integrally from shell wall 32 to provide support for the base portion 22 of the blending apparatus 20.

Figure 4:
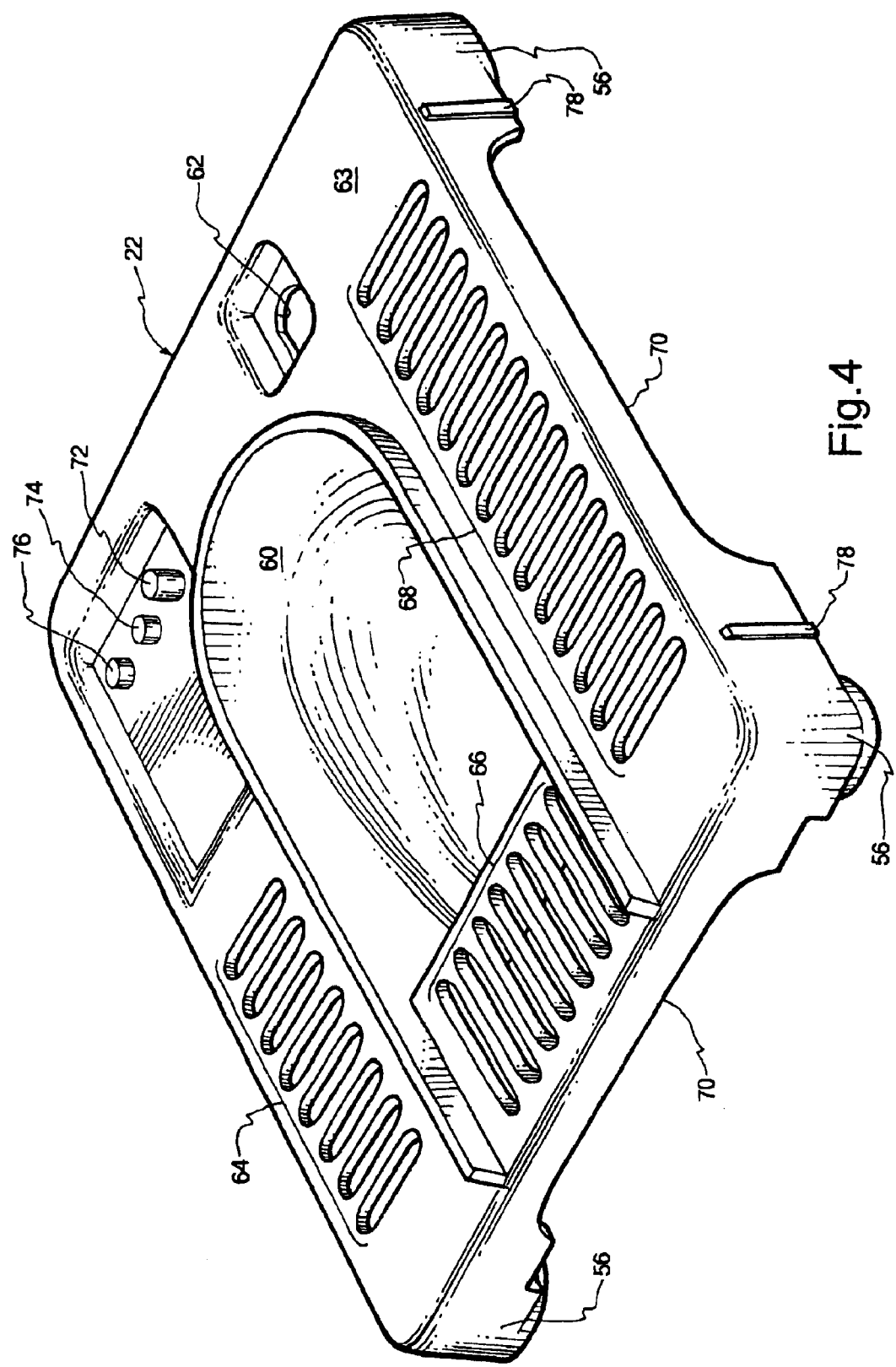
FIG. 4 is a perspective view of the stationary base of the blending device of FIG. 1.
Figure 5:
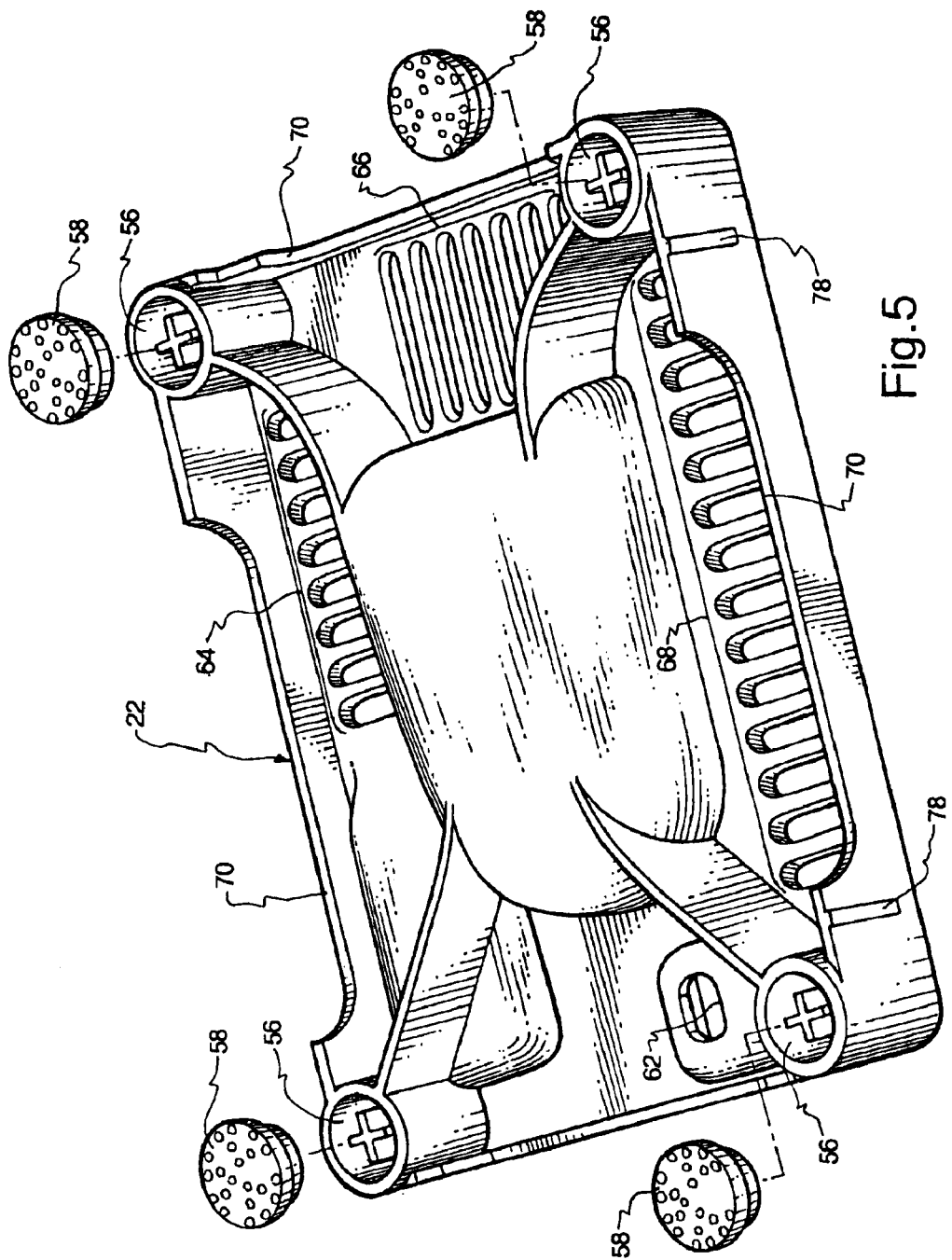
FIG. 5 is a perspective view of the underside of the stationary base of the blending device of FIG. 1.

FIGS. 4 and 5 show the stationary base 22 utilized in connection with the present invention. The base includes four foot locations 56 which define circular wells or pockets into which rubber feet 58 (FIG. 5) are mounted. The rubber feet 58 provide enhanced friction for the surface on which the blending apparatus 20 rests. Still further, the rubber feet 58 are resilient and provide a shock-absorbing and quieting benefit to the blending apparatus 20.

The base 22 defines a central well or concave area 60 which provides a space to allow for articulation of the combined switch plate 50/motor 80 (described below) into the well 60. The base 22 further includes an aperture 62 for receiving a power cord 61 (FIG. 9) which supplies power to the motor. The base further defines three vent areas 64, 66, 68 which allow a sufficient amount of air to flow inside of the cover 24 and around the motor for efficient and effective cooling of the motor. A plurality of archways 70 are formed in each side of the base and are intended to be aligned with archways 40 (FIGS. 1-3) formed in the housing 24 to allow an appropriate flow of air underneath the blending apparatus 20 and around the motor 80.

A plurality of rigid, integral posts 72, 74, 76 extend upwardly from base 22. The posts 72, 74, 76 are oriented opposite switches secured to the articulable housing 24. As described below, the relatively tall post 72 engages a first switch upon articulation of the housing 24 and switch plate 50 relative to the base 22. As the housing 24 and switch plate 50 are further articulated relative to base 22, relatively shorter posts 74, 76 engage other switches to increase the operational speed of the blending apparatus. To ensure that the base 22 fits snugly and appropriately inside of the bottom of housing 24, a plurality of tabs 78 (only one pair are shown) extend outwardly from the main portion of base 22.

While the embodiment of FIGS. 1-9 shows a plurality of switches utilized in connection with the blending device 20, it is to be understood that a single switch may be utilized. Any suitable type of switch known to those skilled in the art may be utilized in connection with the blending device without departing from the spirit and scope of the present invention. For example, an infinitely variable speed switch, which increases the rotational speed of the blending blade in proportion to the distance by which the switch is depressed, may be utilized in connection with the present invention. Still further, a type of variable resistance cushioned foot may be utilized so that the degree of deformation of the deformable foot can be measured and the rotational speed of the blade changed in proportion to the degree of deformation of the foot. These are simply examples of switches that may be utilized. Those skilled in the art will understand the various types of switches that may be utilized in connection with the present invention.

Figure 6:
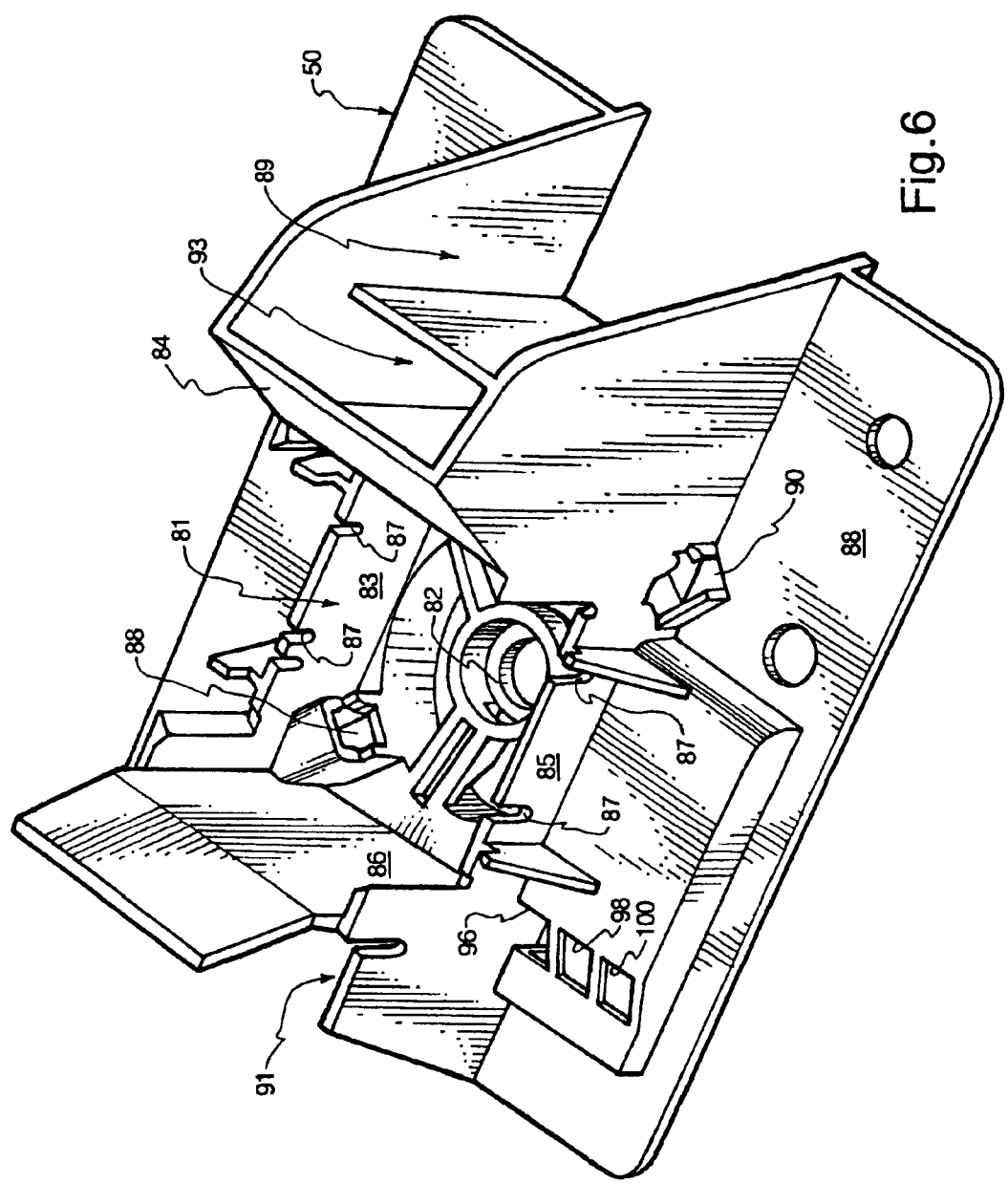
FIG. 6 is a perspective view of the top side of the switch plate utilized in connection with the blending device of FIG. 1.
Figure 7:
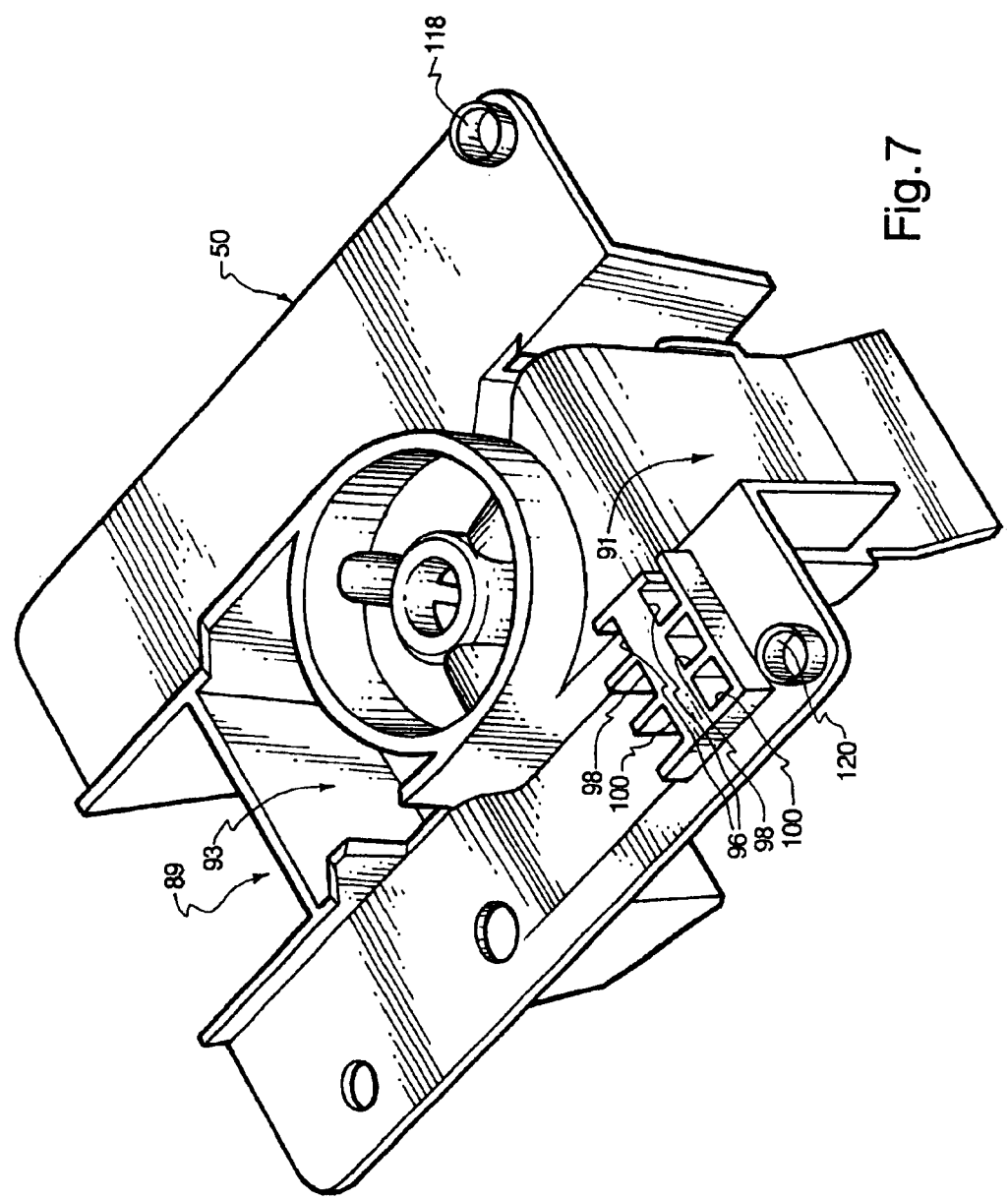
FIG. 7 is a perspective view of the underside of the switch plate utilized in connection with the blending device of FIG. 1.
Figure 8:
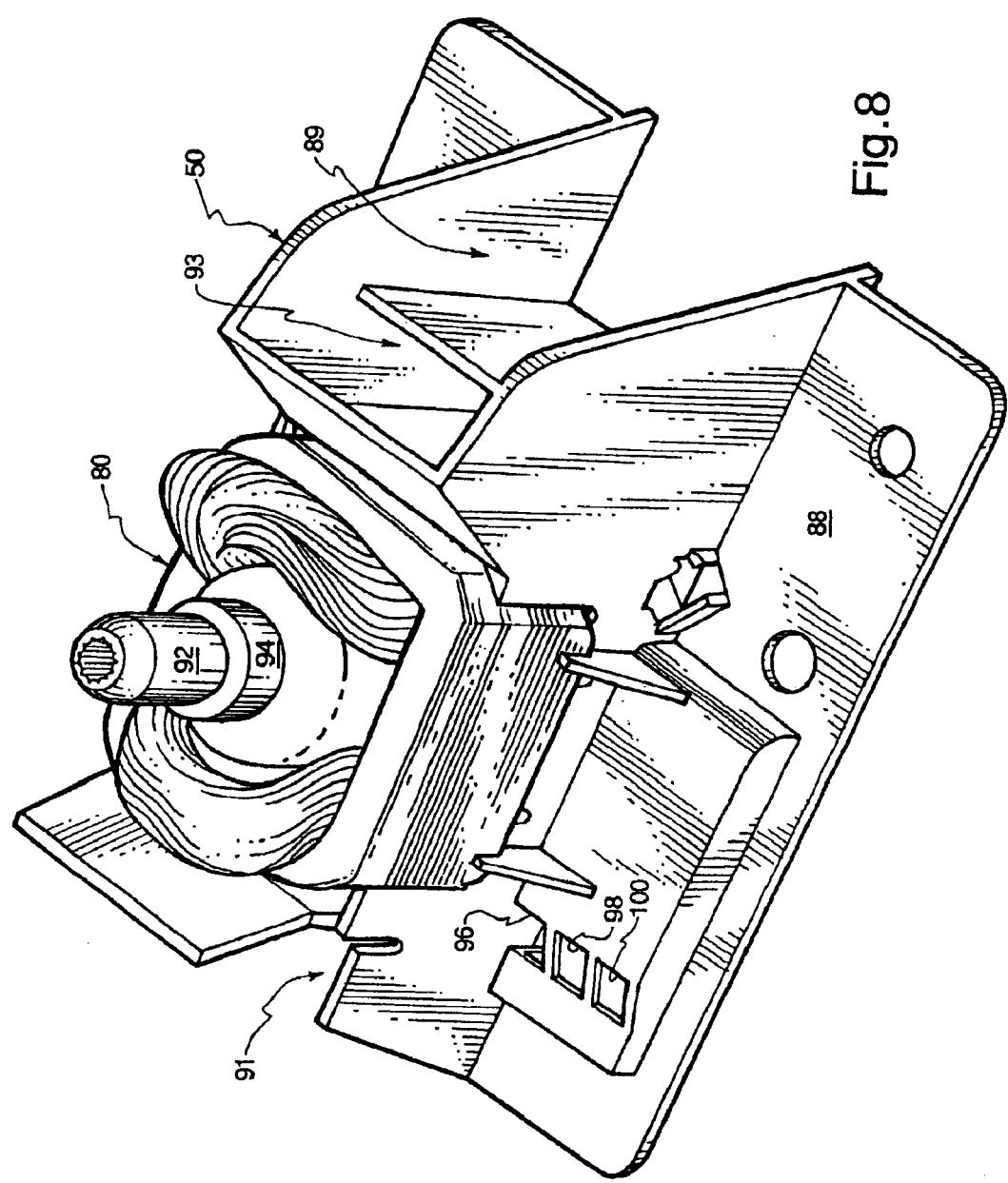
FIG. 8 is a perspective view of the switch plate with a motor secured inside the motor receiving area of the switch plate.

FIGS. 6–8 show the switch plate 50 which secures the motor 60 (FIG. 8) inside the articulable housing 24. The switch plate 50 includes generally a motor retaining area 81 which includes a central aperture 82 for concentrically mounting a bearing associated with the shaft of motor 80. Guide walls 83, 84, 85, 86 provide a relatively tight fit for motor 80 such that the motor can be properly aligned with respect to the switch plate 50. Grooves 87 allow lead wires for the motor to extend through guide walls 83, 85. Passageways 88, 90 provide mounting locations for brushes for the motor. Open areas 89, 91, 93 (FIGS. 6–9) allow air to circulate about motor 80 (FIGS. 8 and 9).

After the motor 80 has been positioned in its appropriate location inside motor receiving area 81, the entire assembly is urged upwardly into the articulable housing 24 (FIGS. 2 and 3) until the transverse wall 88 of the switch plate 50 snaps into place and is held in the appropriate position by retaining tabs 46 (FIG. 3). When appropriately installed, the drive spline 92 (FIG. 8) and associated bearing 94 fit snugly inside of mounting aperture 38 (FIG. 3) in the articulable housing 24. FIG. 9 shows the motor 80 and switch plate 50 secured inside of housing 24.

Figure 9:
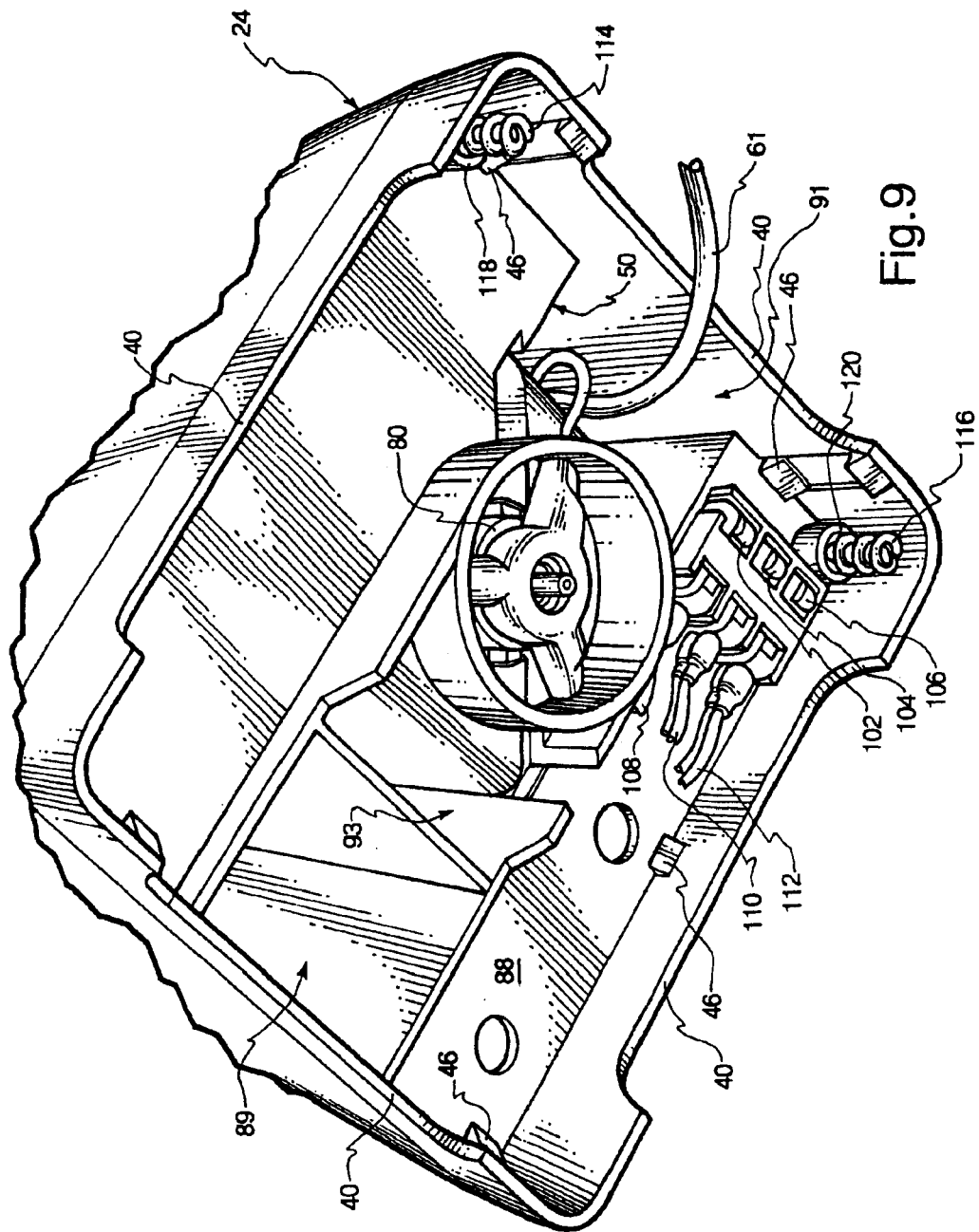
FIG. 9 is a partial perspective view of the blending apparatus of FIG. 1 showing the stationary base removed and showing the switch plate secured inside the housing of FIG. 2 and holding the motor in operative position within the housing of the blending device.
Figure 10:
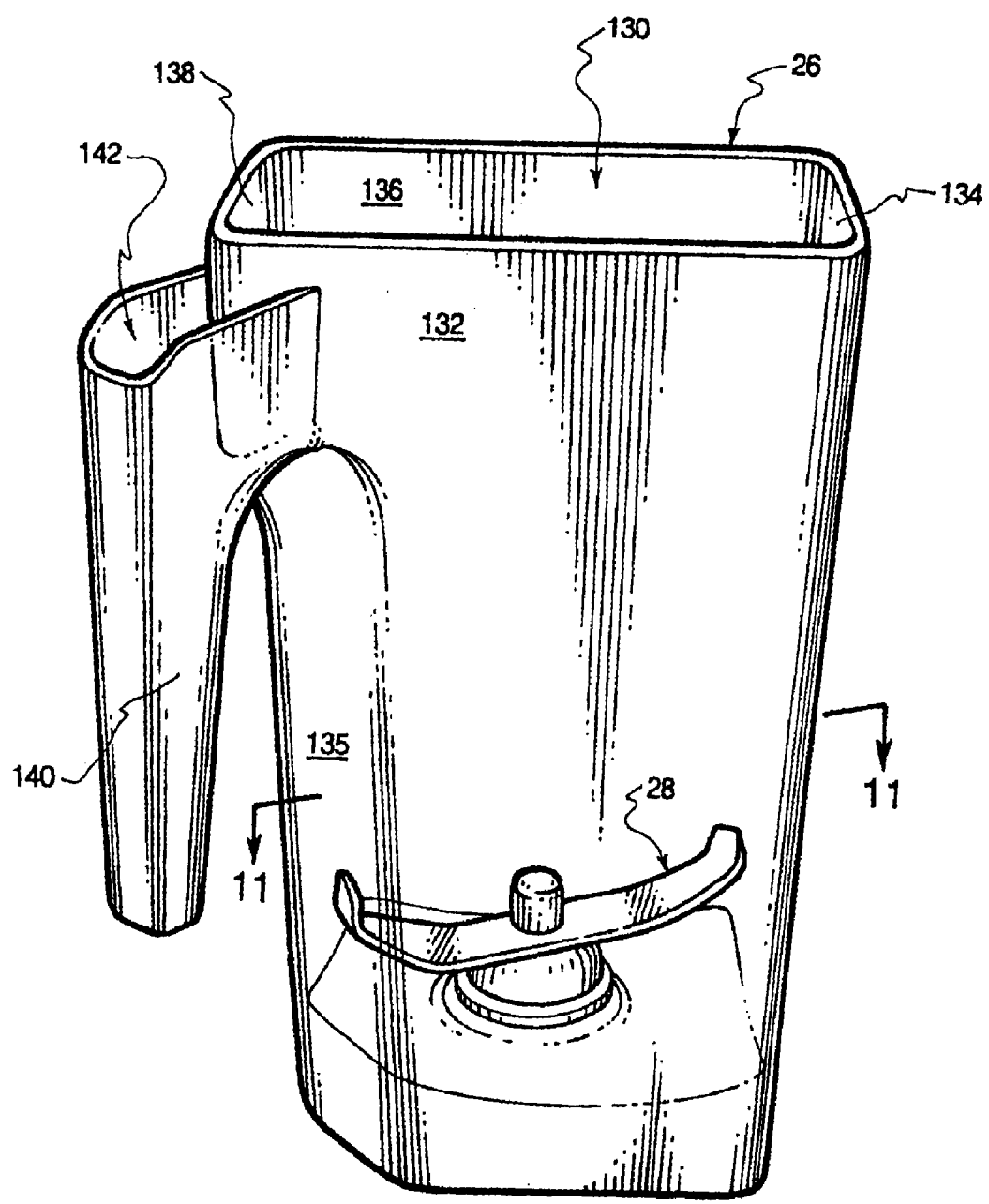
FIG. 10 is a perspective view of the mixing jar utilized in connection with the blending apparatus shown in FIG. 1.

The switch plate 50 further defines a plurality of apertures 96, 98, 100 (FIGS. 6–8) which receive a plurality of switches 102, 104, 106 (FIG. 9). The appropriate lead wires 108, 110, 112 are coupled to switches 102, 104, 106, respectively, and provide power to the motor 80. Upon securing the switch plate 50 and appropriately secured switches 102, 104, 106 inside of housing 24, the switches 102, 104, 106 are positioned for appropriate engagement with posts 72, 74, 76 (FIG. 4) upon articulation of the housing 24 relative to the base 22.

To bias the base 22 away from switch plate 50, bias members in the form of a pair of coil springs 114, 116 are disposed inside of appropriately sized pockets 118, 120 (FIGS. 7 and 9). Springs 114, 116 are held in a compressed, biasing condition upon installation of base 22 within housing 24. Springs 114, 116 engage the top surface 63 of base 22 (FIG. 4).

As shown in FIG. 1, the initial, undisturbed orientation and inclination of housing 24 relative to base 22 creates as differential space 25 toward the back side of the blending device. Space 25 allows for articulation of the cover or housing 24 relative to stationary base 22. In one embodiment, articulation of the housing 24 approximately 1/16 of an inch relative to the base 22, the tall post 72 (FIG. 4) engages switch 102 (FIG. 9) to actuate the motor and rotate the blade 28 at a first rotational speed. At this first or low speed, the blade 28 will rotate between a range of approximately 8,000 rpm to 14,000 rpm (in a no-load condition). Upon further articulation of the housing 24 relative to base 22 an additional 1/16 of an inch, the short posts 74, 76 will engage switches 104, 106 to increase the rotational speed of the blade 28 to between a range of approximately 16,000 rpm to 32,000 rpm (in a no-load condition). Therefore, in one embodiment, the total movement of the articulable housing 24 relative to the stationary base 22 will be approximately 1/8 of an inch. It is to be understood, however, that any reasonable range of articulation of the housing relative to the base (or relative to any stationary surface on which the blending device rests) may be utilized in connection with the present invention.

A benefit relative to the present invention is that the switches 102, 104, 106 serve as the actuation switches for the blending device 20. That is, the articulable housing which actuates switches 102, 104, 106 eliminates the need for a power switch. Switches 102, 104, 106 are, in fact, the power switches. Upon return of the housing 24 to its normal position relative to stationary base 22 (which occurs absent any external force on the lid 30/jar 26 combination), power supplied to the motor 80 (FIGS. 8 and 9) is cut off.

Another benefit of the blending apparatus with an articulable actuation mode include the speed with which beverages can be made. There are no manual buttons or switches that need to be actuated by the fingers of the operator. Rather, as soon as the appropriate ingredients are introduced into the jar 26 (as understood by those skilled in the art), the jar, in combination with the affixed lid 30, is positioned over the upstanding guide extensions on base 24 (FIG. 2). Thereafter, a relatively small amount of downward pressure applied to the top of lid 30 will cause housing 24 to articulate relative to base 22 and actuate one or more of the switches to blend the beverage at the desired speed. This method of making a beverage is faster and more efficient as compared to traditional blending devices that require programming by tactile manipulation. Over the course of days, weeks, and months, the present invention allows many more beverages to be produced to satisfy the demands of customers.

Another unique aspect of the present invention relates to the jar 26. The jar 26 is sized to hold approximately 3 quarts. As shown in FIGS. 10-13, the jar 26 includes an open end 130 into which ingredients for the beverage may be inserted. The opening 130 is defined by four walls 132, 143, 136, 138. A handle 140 is secured to walls 132 and 138 as well as the corner defined by walls 132, 138. Handle 140 includes a central aperture 142 which allows multiple jars 26 to be stacked one on top of another with the handles 140 to be aligned with and positioned inside one another. In contrast, prior art jars have required that the handles be alternated when stacking the jars to avoid the handles impeding one another. Alternating handle positions requires, of course, more space for storage purposes. In the present invention, the nesting of jars 26 will now accommodate all of the handles 140 aligned vertically relative to one another.

Figure 11:
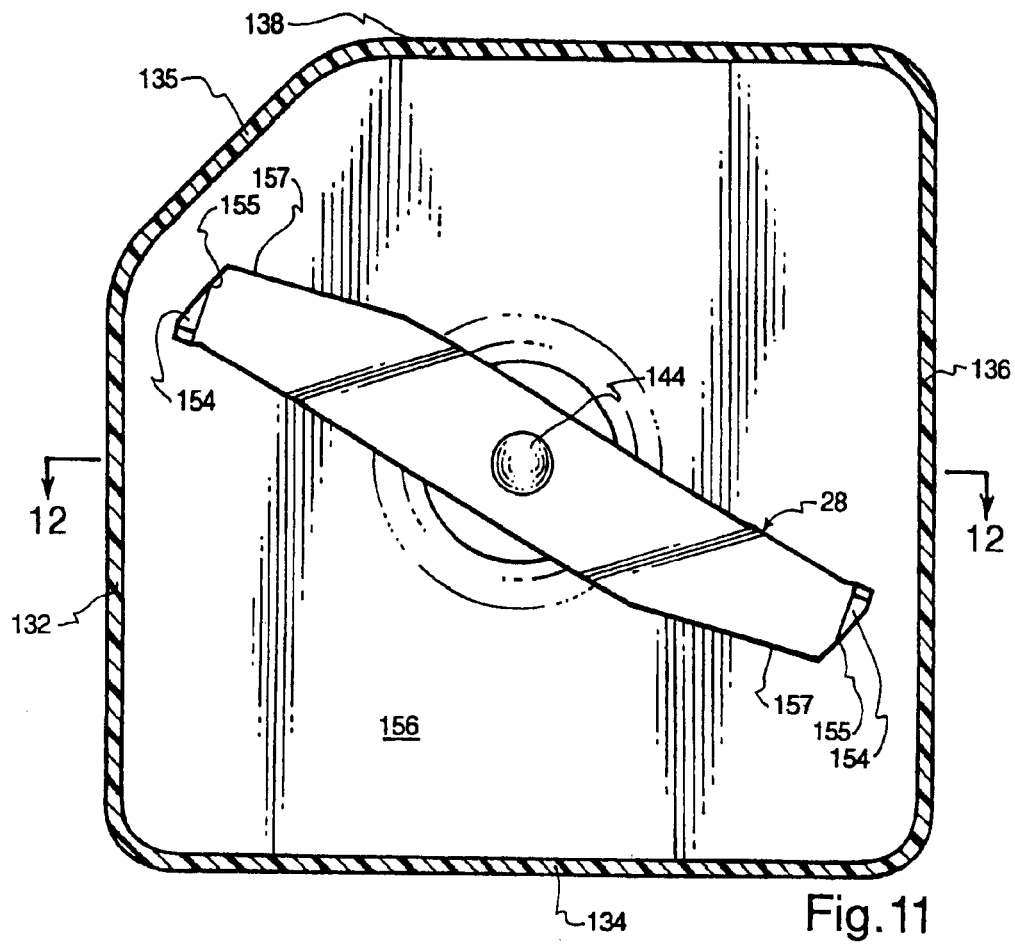
FIG. 11 is a top view of the mixing jar of FIG. 10.

Another novel aspect of the present jar 26 according to the present invention relates to an additional fifth or truncated wall 135 which is positioned opposite handle 140. Wall 135 truncates, in essence, the typical corner that would otherwise be formed between wall 132 and 138. As shown in FIG. 11, wall 135 is much closer to the central axis 144 of blade 28 as compared to the corners formed by walls 132, 134, 136, 138. In one embodiment, wall 135 is approximately 2.4 inches from the central pivot axis 144 of blade 28 (at the height of the blade). In contrast, corners formed by walls 132, 134, 136, 138 are approximately 3.5 inches from the central axis 144. Accordingly, the vortex created when blending liquid inside of container or jar 26 moves away or shifts from the central axis 144 of blade 28. The approximate center of the vortex created by the configuration of jar 26 will be somewhere between pivot axis 144 and wall 135. When blending a liquid inside of jar 26, liquid will climb up on the corner of the jar formed by walls 134 and 136, and will be lower toward wall 135. This type of flow reduces cavitation and increases the speed and efficiency with which beverages, such as smoothies, can be made.

Figure 12:
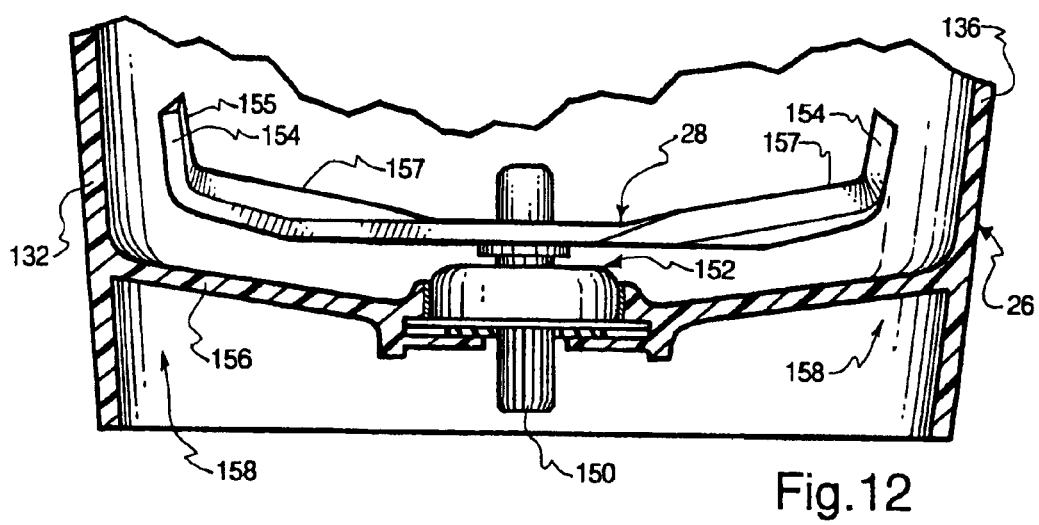
FIG. 12 is an enlarged, partial sectional side elevation view of the blade assembly mounted within the mixing jar as shown in FIG. 10.
Figure 13:
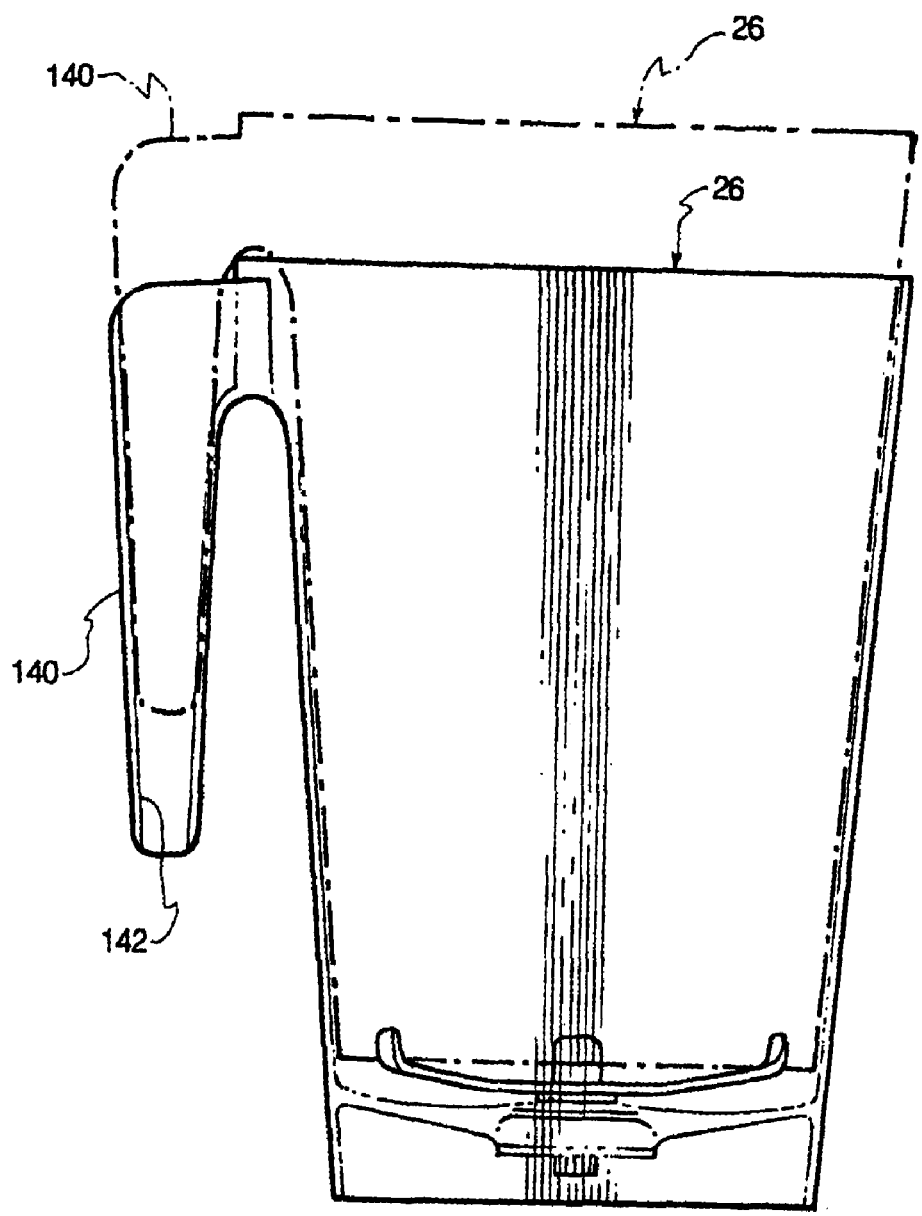
FIG. 13 is a side elevation view of the jar showing how an additional jar can be stacked on top.

FIGS. 11 and 12 show the construction and mounting of blade 28 inside of jar 26. A splined shaft 150 is received by the splined shaft receptacle 92 extending from motor 80 (FIG. 8). This removable connection will allow the blade 28 to rotate upon actuation of the motor 80. A bearing assembly 152 allows free rotation of the splined shaft 150 and attached blade 28. Blade 28 includes blade tips or winglets 154 which extend upwardly substantially parallel to the walls 132–136 of the jar 26. The overall length of the blade 28 is approximately between the range of 4.5 and 4.75 inches. The blade extends outwardly from its attached pivot location 144 in a perpendicular manner. The blade is twisted, however, toward the blade tips 154. Still further, the leading edges 155 of blade tips 154 as well as inclined leading edges 157 of blade 28 are tapered to improve blending efficiency. The entire blade assembly is mounted within a central aperture formed in a bottom wall 156 which forms the floor of the jar 26 for holding contents inside of the jar 26.

The unique blade 28 is relatively large, compared to prior art blades. The single blade construction, as compared to traditional cross-blade construction, allows all types of ingredients, such as IQF fruit, to fall between the ends of blade 28 as it rotates to produce a desired, smooth, and consistent texture of beverage.

The jar further includes lower cavities 158 which correspond in size to upstanding guide walls 36 (FIG. 2) formed on housing 24 for rapid and efficient mounting of the jar 26 on top of housing 24.

Figure 14:
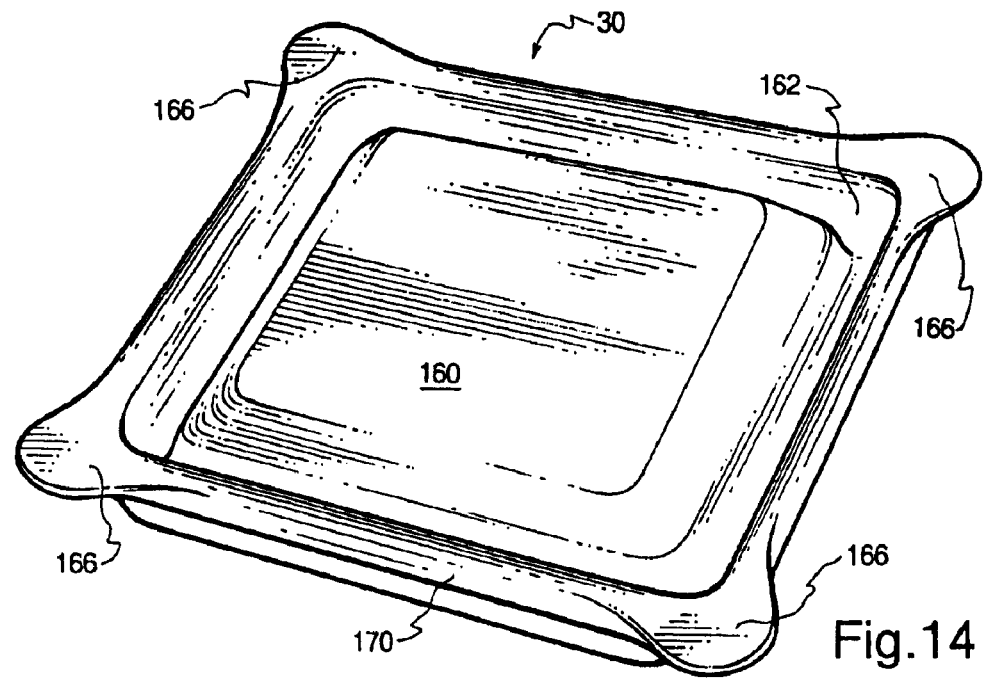
FIG. 14 is a perspective view of the top side of the lid utilized in connection with the mixing jar of FIG. 10.
Figure 15:
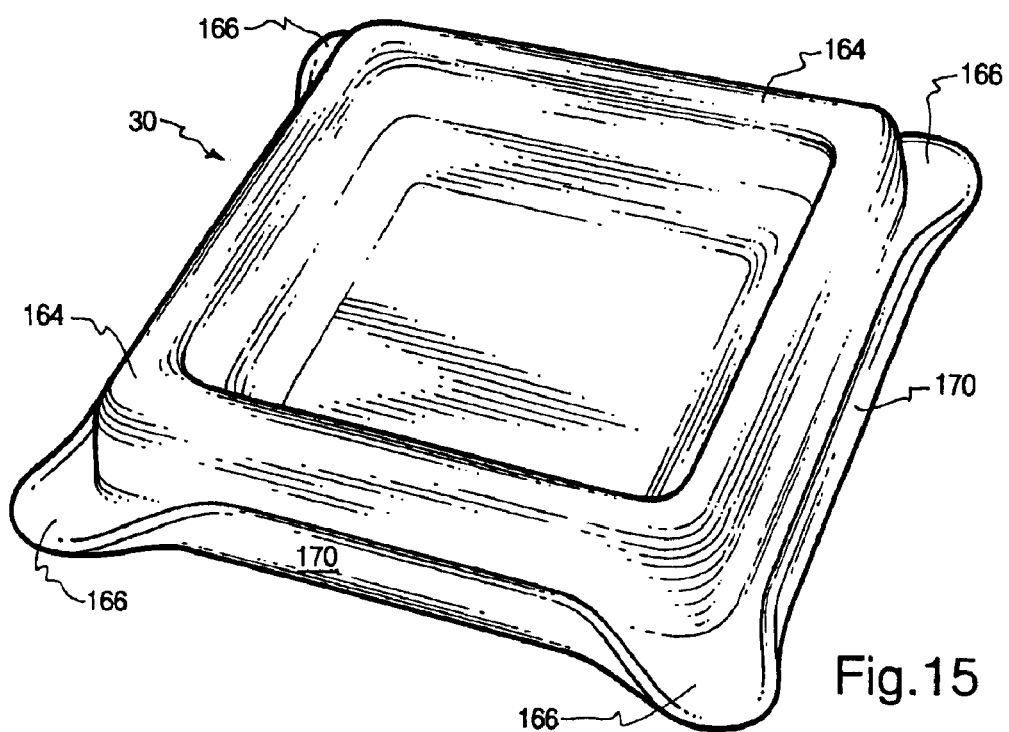
FIG. 15 is a perspective view of the bottom side of the lid utilized in connection with the mixing jar shown in FIG. 10.

FIGS. 14–15 show the lid 30 utilized as a cover for the jar 26 of the blending apparatus 20. The lid 30 is made of a moldable formable rubber material. The lid snaps into the top of jar 26 (FIG. 10) to seal the jar and prevent the user's hands from being inserted into the opening 130 of jar 26 during processing.

The lid 30 more specifically comprises a top surface 160 and a channel 162 which surrounds top surface 160. The channel 162 defines, on the opposite side, a four-wall extension 164 which seats inside of opening 130 upon installation of the lid 30 onto jar 26. A plurality of tabs 166 extend outwardly from each corner of the lid 30 to provide an easy location for grasping the lid and removing the lid after completion of a blending cycle. A plurality of downwardly extending jar retaining walls 170 extend between tabs 166 so that the lid 30, when installed over jar 26, is retained in its desired location.

Another novel aspect of the present invention is that because articulation of the cover 24 relative to stationary base 22 is required to actuate the blending device 20, downward pressure on top surface 160 of lid 30 is generally required. Such downward pressure will urge the downwardly extending walls 164 of the lid 30 toward the inside surfaces of jar opening 130 to seal the lid 30 tightly against jar 26 and prevent liquids from escaping during the blending process. In addition, because downward pressure on lid 30 is required, as a general matter, to articulate the housing 24 relative to stationary base 22, the likelihood of the operator of the blending apparatus 20 inserting his or her hand into opening 130 during the blending process is greatly reduced.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the spirit of the invention. The words "including" and "having," as used in the specification, including the claims, shall have the same meaning as the word "comprising."

What is claimed is:

1. A blending jar apparatus, comprising:
   a movable blending member;
   a plurality of walls;
   the plurality of walls defining a jar opening;
   a handle secured to one of the plurality of walls;
   wherein the handle comprises an aperture receptive of a handle of another blending jar apparatus.

2. A blending jar apparatus according to claim 1 wherein the aperture is a central tapered aperture.

3. A blending jar apparatus according to claim 1, wherein said blending member comprises a blade disposed within the jar.

4. A blending jar apparatus according to claim 3 wherein the blade comprises a blade tip extending upwardly at each end of the blade.

5. A blending jar apparatus according to claim 4 wherein the blade tips at each end extend upwardly substantially parallel to the plurality of walls.

6. A blending jar apparatus according to claim 3 wherein the blade is between approximately 4.5 and 4.75 inches in length.

7. A blending jar apparatus comprising:
   a movable blending member;
   a plurality of walls;
   a handle secured to one of the plurality of walls;
   wherein the handle comprises an aperture receptive of a handle of another blending jar apparatus;
   wherein the plurality of walls further comprises four walls defining a jar opening.

8. A blending jar apparatus according to claim 7, further comprising a fifth truncated wall positioned opposite of the handle.

9. A blending jar apparatus according to claim 8 wherein the fifth truncated wall is positioned closer to a center of the jar apparatus as compared to corners formed by the four walls.

10. A blending jar apparatus according to claim 9 wherein the fifth wall is approximately 2.4 inches from the center of the blending jar apparatus.

11. A blending jar apparatus according to claim 10 wherein the corners formed by the four walls are each approximately 3.5 inches from the center of the jar apparatus.

12. A blending jar apparatus according to claim 8 wherein the four walls are arranged in a generally rectangular, tapered shape.

13. A blending jar apparatus, comprising:
   a plurality of walls;
   a handle secured to one of the plurality of walls;
      wherein the handle comprises an aperture receptive of a handle of another blending jar apparatus;
   a blade disposed within the jar;
      wherein the blade comprises a blade tip extending upwardly at each end of the blade;
         wherein the blade tips at each end extend upwardly substantially parallel to the plurality of walls;
      wherein the blade comprises a twist toward the blade tips.

14. A blending jar apparatus, comprising:
   a movable blending member;
   a plurality of upright walls defining a non-circular jar opening;
   a handle secured to one of the plurality of upright walls;
   wherein the handle comprises an aperture receptive of a handle of another blending jar apparatus.

15. A blending jar apparatus according to claim 14, further comprising a truncated wall positioned opposite of the handle.

* * * * *

EX PARTE REEXAMINATION CERTIFICATE (5949th)
United States Patent
Dickson, Jr.

(10) Number: US 6,854,876 C1
(45) Certificate Issued: *Oct. 16, 2007

(54) NESTABLE BLENDING JAR APPARATUS

(75) Inventor: Thomas D. Dickson, Jr., Midway, UT (US)

(73) Assignee: K-Tec, Inc., Orem, UT (US)

Reexamination Request:
No. 90/008,012, Apr. 17, 2006

Reexamination Certificate for:
Patent No.: 6,854,876
Issued: Feb. 15, 2005
Appl. No.: 10/457,899
Filed: Jun. 10, 2003

(*) Notice: This patent is subject to a terminal disclaimer.

Related U.S. Application Data

(63) Continuation of application No. 10/150,919, filed on May 17, 2002, now Pat. No. 6,811,303.

(51) Int. Cl.
*A47J 43/04* (2006.01)
*A47J 43/07* (2006.01)
*A47J 43/046* (2006.01)

(52) U.S. Cl. .................. 366/205; 366/314; 206/518
(58) Field of Classification Search .............. None
See application file for complete search history.

(56) References Cited

U.S. PATENT DOCUMENTS

| | | |
|---|---|---|
| 1,480,914 A | 1/1924 | Poplawski |
| 1,910,981 A | 5/1933 | Bescherer |
| D104,289 S | 4/1937 | Osius |
| 2,086,858 A | 7/1937 | Dunkelberger |
| 2,109,501 A | 3/1938 | Osius |
| 2,271,822 A | 2/1942 | Hills |
| 2,282,866 A | 5/1942 | Hagen |
| D163,117 S | 5/1951 | Hobbs |
| 2,798,701 A | 7/1957 | Cullura |
| 2,803,375 A | 8/1957 | Meshberg |
| 2,885,134 A | 5/1959 | Meyer |
| 2,924,349 A | 2/1960 | Huck |
| 2,932,437 A | 4/1960 | Wilcox |
| D191,152 S | 8/1961 | Rawson et al. |
| D198,303 S | 5/1964 | Dewenter |
| 3,175,594 A | 3/1965 | Jepson et al. |
| 3,216,473 A | 11/1965 | Dewenter |
| 3,240,246 A | 3/1966 | Dewenter |
| 3,318,583 A | 5/1967 | Wright et al. |
| 3,342,425 A | 9/1967 | Morton |
| 3,358,609 A | 12/1967 | Worth et al. |
| 3,368,800 A | 2/1968 | Barnard, Jr. |
| 3,596,795 A | 8/1971 | D'Ecroli |
| 3,612,126 A | 10/1971 | Emmons et al. |
| D227,535 S | 7/1973 | Pitcher |
| 3,810,470 A | 5/1974 | Von Gunten |
| 3,837,587 A | 9/1974 | Walter et al. |
| 3,841,528 A | 10/1974 | Eisenberg |
| 3,873,435 A | 3/1975 | Ziebarth et al. |
| 4,039,693 A | 8/1977 | Adams et al. |
| 4,087,053 A | 5/1978 | Voglesonger |
| 4,136,022 A | 1/1979 | Hutzler |
| 4,269,519 A | 5/1981 | Birr |
| 4,297,038 A | 10/1981 | Falkenbach |
| 4,449,610 A | 5/1984 | Bar |

(Continued)

FOREIGN PATENT DOCUMENTS

JP 01-145031 6/1989

(Continued)

OTHER PUBLICATIONS

Vita–Mix blending container, date unknown, 14 pages (each page marked "VMBI").

(Continued)

*Primary Examiner*—Kiley Stoner

(57) ABSTRACT

A blending jar apparatus is disclosed and includes a plurality of walls and a handle secured to one of the plurality of walls. The handle includes an aperture receptive of a handle of another blending jar apparatus. One of the plurality of walls may include a truncated wall, to which the handle is secured.

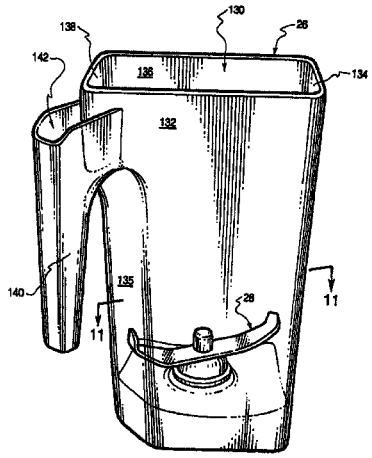

U.S. PATENT DOCUMENTS

| | | | |
|---|---|---|---|
| 4,467,934 A | 8/1984 | Hummer | |
| 4,487,509 A | 12/1984 | Boyce | |
| 4,561,782 A | 12/1985 | Jacobsen et al. | |
| 4,664,530 A | 5/1987 | Kurome et al. | |
| 4,681,030 A | 7/1987 | Herbert | |
| 4,745,773 A | 5/1988 | Ando | |
| 4,786,002 A | 11/1988 | Mitsubayashi et al. | |
| 4,889,209 A | 12/1989 | Sears | |
| 4,892,413 A | 1/1990 | Vats | |
| 4,911,557 A | 3/1990 | Dormer et al. | |
| 4,919,075 A | 4/1990 | Himi | |
| D310,932 S | 10/1990 | Mitsubayashi | |
| D311,658 S | 10/1990 | Mitsubayashi | |
| D322,570 S | 12/1991 | Nylander | |
| 5,212,359 A | 5/1993 | Morganti | |
| D336,590 S | 6/1993 | Barnard | |
| 5,219,419 A | 6/1993 | Prothe | |
| 5,272,285 A | 12/1993 | Miller | |
| 5,323,973 A | 6/1994 | Ferrara, Jr. | |
| 5,347,205 A | 9/1994 | Piland | |
| 5,360,176 A | 11/1994 | Mugge et al. | |
| 5,380,086 A | 1/1995 | Dickson | |
| 5,425,579 A | 6/1995 | Sampson | |
| 5,432,306 A | 7/1995 | Pfordresher | |
| 5,454,470 A | 10/1995 | Bricker | |
| D367,797 S | 3/1996 | Hauser, II et al. | |
| 5,533,797 A | 7/1996 | Gelber | |
| D373,280 S | 9/1996 | Johnson | |
| 5,603,229 A | 2/1997 | Cocchi et al. | |
| 5,619,901 A | 4/1997 | Reese | |
| 5,639,161 A | 6/1997 | Sirianni | |
| 5,655,834 A | 8/1997 | Dickson | |
| 5,660,468 A | 8/1997 | Okajima et al. | |
| 5,696,358 A | 12/1997 | Pfordresher | |
| 5,709,095 A | 1/1998 | Johnson | |
| 5,711,601 A | 1/1998 | Thomas et al. | |
| 5,855,431 A | 1/1999 | Costanzo | |
| 5,957,577 A | 9/1999 | Dickson et al. | |
| D429,956 S | 8/2000 | Bohannon et al. | |
| D435,192 S | 12/2000 | Bohannon et al. | |
| D436,789 S | 1/2001 | Dickson et al. | |
| 6,186,395 B1 | 2/2001 | Kennett | |
| 6,326,047 B1 | 12/2001 | Farrell | |
| 6,338,569 B1 | 1/2002 | McGill | |
| 6,394,297 B1 | 5/2002 | Nance | |
| D480,905 S | 10/2003 | Pai | |
| 6,755,305 B2 | 6/2004 | Nance | |
| 6,811,303 B2 | 11/2004 | Dickson, Jr. | |
| 6,854,876 B2 | 2/2005 | Dickson, Jr. | |
| D506,393 S | 6/2005 | Nottingham et al. | |
| 6,979,117 B2 | 12/2005 | Dickson, Jr. | |
| 7,063,456 B2 | 6/2006 | Miller et al. | |
| D528,363 S | 9/2006 | Ulanski et al. | |
| 2002/0012288 A1 | 1/2002 | Misap et al. | |
| 2004/0159624 A1 | 8/2004 | Miller et al. | |
| 2005/0122837 A1 | 6/2005 | Bravard et al. | |
| 2006/0171249 A1 | 8/2006 | Dickson, Jr. | |
| 2006/0187749 A1 | 8/2006 | Miller et al. | |

FOREIGN PATENT DOCUMENTS

| | | |
|---|---|---|
| JP | 01-310616 | 12/1989 |
| JP | 04-017820 | 1/1992 |
| WO | WO 96/15706 | 5/1996 |
| WO | WO 03/001954 | 1/2003 |

OTHER PUBLICATIONS

The Blendtec Smoother—The Legendary Performer, Oct. 2000, 2 pages, K–Tec.

Cool Attitude, Frozen BEV Machines, Foodservice Equipment Reports, Jul. 2000, p. 54.

Frozen Drinks As Simple As 1–2–3, Reader Service No. 57, advertisement for Portion Blending System, date unknown, 1 page, Vita–Mix Foodservice.

Portion Blender Gets it Right, Jul. 2000, p. 51, Foodservice Equipment Reports.

Come Taste a Tropical Paradise, Advertisement for The SB3X ice– shaver/blender, Jul. 15, 1999, 1 page, Island Oasis Frozen Cocktail Co.

Blender jar drawings, date unknown, 2 pages (each page marked "KTEC1"), K–Tec.

Important Jar Care Information Sheet, date unknown, 1 page, K–Tec.

K–TEC, "The Blendtec ABC™—Featuring Advanced Blending Control," Blendtec sales brochure, dated Oct. 2000, USA.

US 6,854,876 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–6, 8–9, 13 and 15 are cancelled.

Claims 7, 10, 12 and 14 are determined to be patentable as amended.

Claim 11, dependent on an amended claim, is determined to be patentable.

7. A blending jar apparatus, comprising:
a movable blending member;
a plurality of walls;
a handle secured to one of the plurality of walls; *and a fifth truncated wall;*
wherein the handle comprises an aperture receptive of a handle of another blending jar apparatus;
wherein the plurality of walls further comprises four walls defining a jar opening;
*wherein the fifth truncated wall is positioned closer to a center of the jar apparatus as compared to corners formed by the four walls.*

10. A blending jar apparatus according to claim [9] *7* wherein the fifth wall is approximately 2.4 inches from the center of the blending jar apparatus.

12. A blending jar apparatus according to claim [8] *7* wherein the four walls are arranged in a generally rectangular, tapered shape.

14. A blending jar apparatus, comprising:
a movable blending member;
a plurality of upright walls defining a non-circular jar opening, *the plurality of walls including a truncated wall*;
a handle secured to one of the plurality of upright walls; *and*
wherein the handle comprises an aperture receptive of a handle of another blending jar apparatus;
*wherein the trucated wall is positioned closer to a center of the jar apparatus as compared to corners formed by the plurality of walls.*

\* \* \* \* \*